US006958959B2

(12) United States Patent
Abe et al.

(10) Patent No.: US 6,958,959 B2
(45) Date of Patent: Oct. 25, 2005

(54) APPARATUS FOR REPRODUCING INFORMATION BASED ON THE TYPE OF COMPRESSION METHOD USED IN COMPRESSING THE INFORMATION

(75) Inventors: Shinichiro Abe, Kawagoe (JP); Takayuki Iijima, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 286 days.

(21) Appl. No.: 09/815,338

(22) Filed: Mar. 23, 2001

(65) Prior Publication Data

US 2001/0048647 A1 Dec. 6, 2001

(30) Foreign Application Priority Data

Mar. 27, 2000 (JP) ............................ 2000-086533

(51) Int. Cl.[7] ................................................ G11B 7/00

(52) U.S. Cl. ............................ 369/47.24; 369/124.06; 369/59.13

(58) Field of Search ........................ 369/47.24, 124.06, 369/59.13

(56) References Cited

U.S. PATENT DOCUMENTS 4,631,746 A * 12/1986 Bergeron et al. ........... 704/217
5,224,087 A * 6/1993 Maeda et al. ............ 369/53.12
5,244,705 A * 9/1993 Tsurushima et al. ....... 428/64.4
5,611,018 A * 3/1997 Tanaka et al. ............. 704/215
5,671,389 A * 9/1997 Saliba ........................ 711/111
5,771,340 A * 6/1998 Nakazato et al. .......... 358/1.15
5,819,214 A * 10/1998 Suzuki et al. ............... 704/229
5,878,010 A * 3/1999 Okamoto et al. ............. 360/48
5,963,521 A * 10/1999 Nagashima et al. ..... 369/53.37
6,065,094 A * 5/2000 Akiyama .................... 711/112
6,081,784 A * 6/2000 Tsutsui ....................... 704/501
6,212,097 B1 * 4/2001 Kihara et al. .......... 365/185.04
6,259,859 B1 * 7/2001 Katsuki et al. ............. 386/104
6,408,332 B1 * 6/2002 Matsumoto et al. ........ 709/219
6,411,771 B1 * 6/2002 Aotake ........................ 386/52

* cited by examiner

*Primary Examiner*—Gautam R. Patel
(74) *Attorney, Agent, or Firm*—Drinker Biddle & Reath LLP

(57) ABSTRACT

An information reproducing apparatus which reads compressed information recorded on a recording medium by one of a plurality of different compression methods, writes the compressed information read into a memory, supplies the compressed information in the memory, to an expander in the order of writing and outputs reproduced information. The type of compression method used in compressing the information read from the recording medium is determined and the timing of starting to read the compressed information from the memory is controlled in accordance with a determination.

6 Claims, 3 Drawing Sheets

APPARATUS FOR REPRODUCING INFORMATION BASED ON THE TYPE OF COMPRESSION METHOD USED IN COMPRESSING THE INFORMATION

BACKGROUND OF THE INVENTION

1. Field of the Invention

The present invention relates to an information reproducing apparatus which decompresses compressed information that is recorded on a recording medium and outputs the decompressed information as reproduction information.

2. Description of the Related Background Art

An MD (Mini Disc) player, which is one type of information reproducing apparatus, has a DRAM (dynamic random access memory) in order to ensure satisfactory vibration resistance while being carried by a walking user or when used on a moving vehicle. The DRAM temporarily stores compressed information which has been read from an MD by a pickup, while the compressed information that has been stored is read and then is decompressed by a decoder, before being output as reproduction information. It is possible to reproduce by decompressing the compressed information in the DRAM while data including a misread error is read again, even when a read error is caused by vibration. Therefore, a problem of intermittent sound, so called skipping, can be prevented from occurring.

In playback of the MD, when compressed information is stored in the DRAM up to the storage capacity thereof, reading operation of the pickup is stopped. When the amount of compressed information stored in the DRAM decreases to a storage amount requiring replenishment, the pickup resumes the reading operation thereby storing the compressed information that has been read into the DRAM.

However, in the case when starting the playback of the MD, reproduced information is not immediately output from the MD player even when a command to start playback is issued. When compressed information of a predetermined storage amount required for start of reproduction is stored in the DRAM, the MD player starts outputting the reproduced information. In order to quickly output the reproduced information when the command to start playback of the MD is issued, although reducing the storage amount required for start of reproduction of the DRAM is considered, there is a possibility of impairing the vibration resistance.

SUMMARY OF THE INVENTION

An object of the present invention is to provide an information reproducing apparatus which is capable of starting the output of reproduced information quickly after starting the playback operation of a recording medium without impairing the vibration resistance.

The information reproducing apparatus of the present invention includes an expander for expanding compressed information recorded on a recording medium by one of a plurality of different compression methods, and outputs reproduced information based on the expanded information, the apparatus comprising: a reading device for reading compressed information recorded on the recording medium; a memory controller for writing the compressed information read by the reading device into a memory, reading the compressed information written in the memory in the order of writing and supplying the read information to the expander; and a judging device for determining which of the plurality of compression methods is used in compressing the information read by the reading device, wherein the memory controller controls the timing of starting to read the compressed information from the memory in accordance with a determination by the judging device.

The information reproducing apparatus of the present invention includes an expander for expanding compressed information recorded on a recording medium by one of a plurality of different compression methods, and outputs reproduced information based on the expanded information, the apparatus comprising: a reading device for reading compressed information recorded on the recording medium; a memory controller for writing the compressed information read by the reading device in a memory, reading the compressed information written in the memory in the order of writing and supplying the compressed information to the expander; a judging device for determining which of the plurality of compression methods is used in compressing the information read by the reading device; and a reading controller for controlling a reading time of the reading device in accordance with a determination of the judging device.

DETAILED DESCRIPTION OF THE PREFERRED EMBODIMENT

A preferred embodiment of the present invention will be described in detail below with reference to the accompanying drawings.

Figure 1:
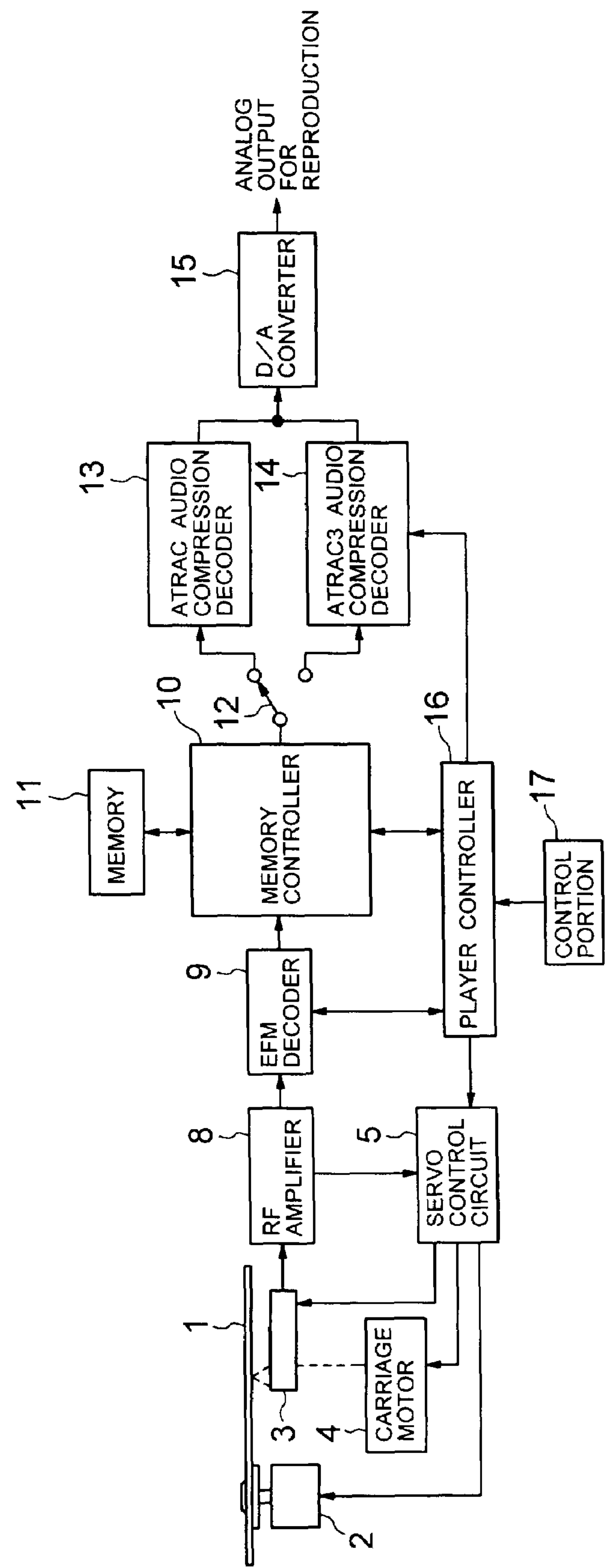
FIG. 1 is a block diagram showing an embodiment of the present invention.

In an MD (Mini Disc) player, shown in FIG. 1, which is an information reproducing apparatus of one embodiment of the present invention, an MD (Mini Disc) 1 is driven to rotate by a spindle motor 2. As the disc 1 is rotated, information recorded on the disc 1 is optically read by a pickup 3. The pickup 3 is supported by a carriage (not shown) which is moved by a carriage motor 4 in the radial direction of the disc 1, so that an information read point (information reading light spot) of the pickup 3 is positioned while being freely moved along the radial direction of the disc 1. Also servo control systems are provided including a spindle servo system, a focusing servo system, a tracking servo system and a carriage servo system.

The spindle motor 2 and the carriage motor 4 are controlled by a servo control circuit 5 located in the spindle servo system and the carriage servo system. The servo control circuit 5 controls the spindle motor 2 and the carriage motor 4, and carries out servo control such as on-off control of the servo systems as mentioned above and jump control of the information read point under the command from the player controller 16. An RF (Radio Frequency) signal which is a read signal output from the pickup 3 is amplified by an RF amplifier 8 and then is supplied to an EFM (Eight to Fourteen Modulation) decoder 9. The EFM decoder 9 applies error correction of the CIRC (Cross Interleave Reed-Solomon Code) scheme to data of the read signal and carries out EFM demodulation. An output of the EFM decoder 9 is connected to a memory controller 10 that controls writing and reading of a memory 11 which is a DRAM. The memory controller 10 controls writing and reading of EFM-demodulated data to and from the memory 11 when the MD 1 is played. Data read by the memory controller 10 is deleted from the memory 11. Connected to the memory controller 10 via a selection switch 12 are two audio compression decoders 13, 14. Data read by the memory controller 10 is supplied to either one of the audio compression decoders 13, 14 selected by the selection switch 12. The audio compression decoder 13 demodulates a digital audio signal that has been compressed and recorded by means of audio compression technology of the ATRAC (Adaptive Transform Acoustic Coding) method. The audio compression decoder 14 demodulates digital audio signal that has been compressed and recorded by the audio compression technology of the ATRAC3 method that has a higher compression rate than the ATRAC method. The audio compression technology of the ATRAC3 method has two modes of compression rate, double compression and quadruple compression. The audio compression decoder 14 corresponds to the both modes of compression rate while switching the compression rate in accordance with a command from the player controller 16, which operates as a judging device. The digital audio signal provided by the audio compression decoder 13 or 14 is converted into an analog audio signal by a D/A (digital to analog) converter 15.

The EFM decoder 9, the memory controller 10, the selection switch 12 and the audio compression decoder 14 are controlled by the player controller 16. The player controller 16 also controls the MD player under an operation command from a control portion 17. The player controller 16 is constituted by, for example, a micro computer.

In the MD player having the constitution as described above, the player controller 16 starts playback operation when a playback command is issued by a user operation on the control portion 17.

Figure 2:
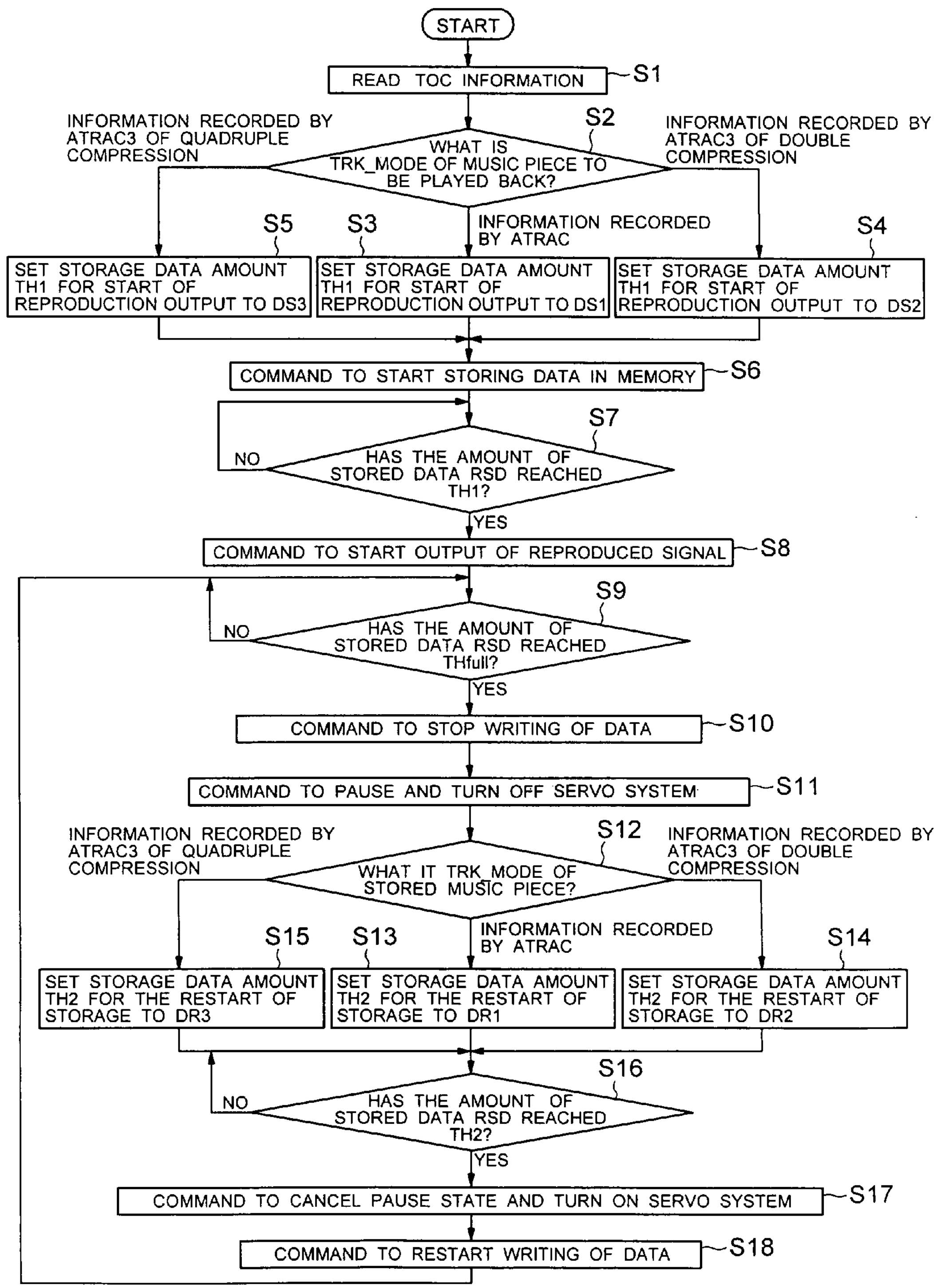
FIG. 2 is a flow chart showing the operation of a player controller.

In the playback operation, the player controller 16 first moves the information read point of the pickup 3 into a TOC (Table of Contents) area on the MD 1 to read TOC information from the TOC area (step S1) and determines TRK_MODE of a music piece to be read (step S2), as shown in FIG. 2. The TOC information includes an item called TRK_MODE which contains information for each track (music piece) of the MD. In the case of information recorded by the ATRAC method, TRK_MODE indicates whether the audio signal recorded is stereo or monaural. In the case of information recorded by the ATRAC3 method, TRK_MODE indicates whether the recorded information is compressed by the double compression or the quadruple compression. Accordingly, by using the information of TRK_MODE, it can be determined whether the information is recorded by the ATRAC method or by the ATRAC3 method. Further in the case of information recorded by the ATRAC3 method, it can be determined whether the recorded information is compressed by the double compression or the quadruple compression.

When a result of the determination in step S2 shows that the information is recorded by the ATRAC method, a storage data amount TH1 for start of outputting a reproduced signal from the MD player is set to DS1 (step S3). When the result of the determination in step S2 shows that the information is recorded by the ATRAC3 method with the double compression, the storage data amount TH1 is set to DS2 (step S4). When the result of the determination in step S2 shows that the information is recorded by the ATRAC3 method with the quadruple compression, the storage data amount TH1 is set to DS3 (step S5). The storage data amounts DS1, DS2 and DS3 are related as DS1>DS2>DS3. A time required in the case of decoding audio signal of the amount DS1 which is compressed by the ATRAC method, a time required in the case of decoding audio signal of the amount DS2 which is compressed by the ATRAC3 method with the double compression, and a time required in the case of decoding audio signal of the amount DS3 which is compressed by the ATRAC3 method with the quadruple compression are substantially the same.

After the storage data amount TH1 for the start of outputting a reproduced signal from the MD player has been set as described above, data of a music piece to be played back are read from the MD 1 and a command to store the read data in the memory 11 is issued to the memory controller 10 (step S6). The data of a music piece to be played back are read by the pickup 3 as an RF signal which is amplified by the RF amplifier 8 and then is supplied to the EFM decoder 9. The RF signal is EFM-demodulated by the EFM decoder 9, and the demodulated signal is digital data that includes audio, control and other information. The control information such as a sub code is supplied to the player controller 16. The player controller 16 controls the servo control circuit 5 in accordance with the control information. The audio information output from the EFM decoder 9, namely a compressed audio signal is written in the memory 11 by the memory controller 10.

The player controller 16, after the execution of step S6, determines whether the amount of data RSD actually stored in the memory 11 has reached the storage data amount TH1 or not (step S7). The amount of data RSD actually stored in the memory 11 is determined by a counting operation in the memory controller 10. Specifically, the memory controller 10 up-counts by writing the data to the memory 11 and down-counts by reading the data from the memory 11. The amount of stored data RSD which has been determined is sent from the memory controller 10 to the player controller 16. When the amount of stored data RSD has increased and reached the storage data amount TH1, the player controller 16 commands a start operation to output of a reproduced signal (step S8). The command is issued to the memory controller 10 and the selection switch 12. The command is generated in response to the result of the determination in step S2, and controls the switching of the selection switch 12. In the case where the result of the determination in step S2 shows that the information is recorded by the ATRAC3 method, the player controller 16 controls the rate of decomposition by the ATRAC3 audio compression decoder 14.

In the case of information recorded by the ATRAC method, the compressed audio signal which has been read from the memory 11 is sent from the memory controller 10 through the selection switch 12 to the ATRAC audio compression decoder 13 which demodulates the digital audio signal that is compressed and recorded by the ATRAC method. Then, the demodulated digital audio signal is converted into an analog reproduced audio signal by the D/A converter 15.

In the case of information compressed by the double compression or the quadruple compression and recorded by the ATRAC3 method, the compressed audio signal which has been read from the memory 11 is sent from the memory controller 10 through the selection switch 12 to the ATRAC3 audio compression decoder 14 which demodulates the digital audio signal that is compressed by the double compression or the quadruple compression of the ATRAC3 method. Then, the demodulated digital audio signal is converted into analog reproduced audio signal by the D/A converter 15.

The player controller 16, after starting the output of the reproduced signal, determines whether the amount of data RSD actually stored in the memory 11 has reached a full storage data amount THfull or not (step S9). The full storage data amount THfull is the maximum amount of data which can be stored in the memory 11. When the amount of stored data RSD has reached the full storage data amount THfull, the player controller 16 commands the memory controller 10 to stop writing of data (step S10), and commands the servo control circuit 5 to enter a pause state and to turn off the servo systems (step S11). Accordingly, writing of data to the memory 11 is stopped, driving of the pickup 3 by the servo control circuit 5 is stopped, and operations of the focusing servo system, the tracking servo system and the carriage servo system are stopped.

The player controller 16, after the execution of step S11, determines TRK_MODE of the music piece of which data has been stored in the memory 11 (step S12). This is similar to the determination in step S2.

When a result of the determination in step S12 shows that the information is recorded by the ATRAC method, the storage data amount TH2 for resumption of storing data into the memory 11 is set to DR1 (step S13). When the result of the determination in step S12 shows that the information is recorded by the ATRAC3 method with the double compression, the storage data amount TH2 is set to DR2 (step S14). When the result of the determination in step S12 shows that the information is recorded by the ATRAC3 method with the quadruple compression, the storage data amount TH2 is set to DR3 (step S15).

After setting the storage data amount TH2 for the resumption of storing data into the memory 11 as described above, it is determined whether the amount of stored data RSD in the memory 11 has reached the storage data amount TH2 for the resumption of storage (step S16). When the amount of stored data RSD that is stored has decreased to the storage data amount TH2, the player controller 16 commands the servo control circuit 5 to cancel the pause state and to turn on the servo systems (step S17), and commands the memory controller 10 to restart writing of data (step S18). Accordingly driving of the pickup 3 is resumed by the servo control circuit 5, and operations of the focusing servo system, the tracking servo system and the carriage servo system are resumed. Thus similarly to the case of step S6, data of the music piece to be played back is read from the pickup 3 as the RF signal, and the RF signal is sent through the RF amplifier 8 and the EFM decoder 9 to the memory controller 10 as compressed audio signal, while writing of the compressed audio signal in the memory 11 by the memory controller 10 is restarted.

After the execution of step S18, the control returns to step S9, so that the operations described above are repeated.

Figure 3A:
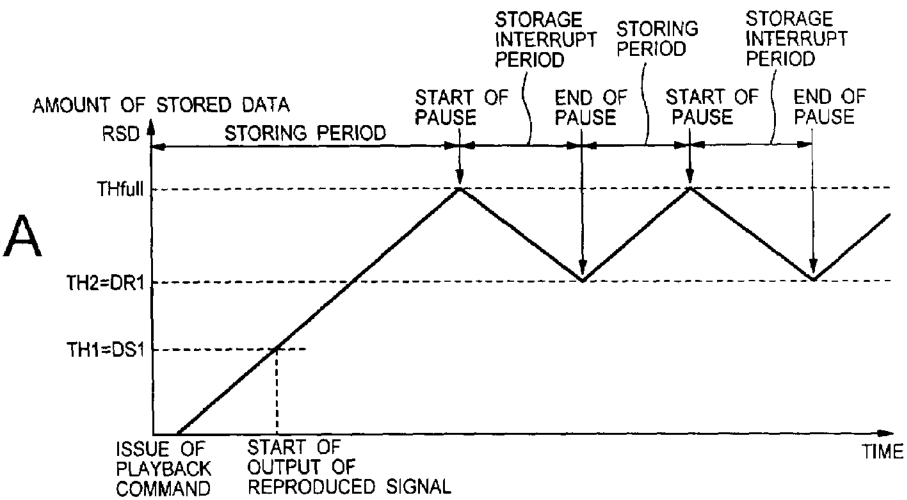
FIG. 3A through FIG. 3C show variations in the amount of stored data RSD in playback of an MD.
Figure 3B:
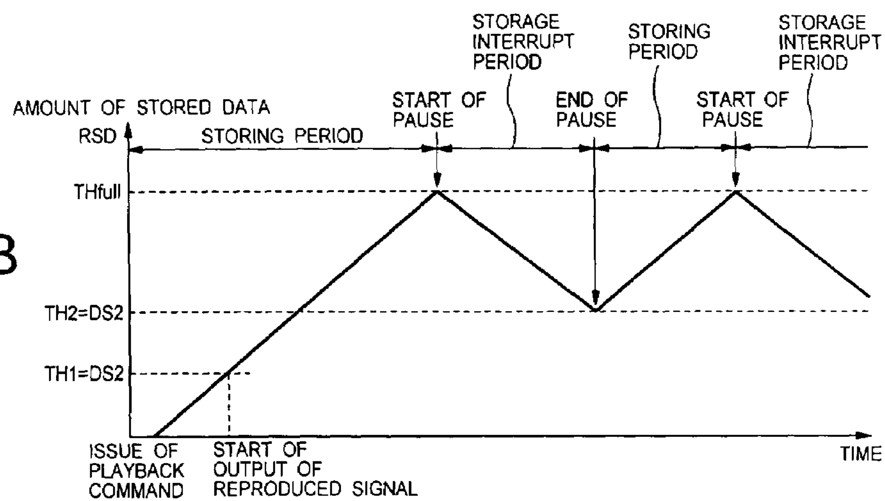
Figure 3C:
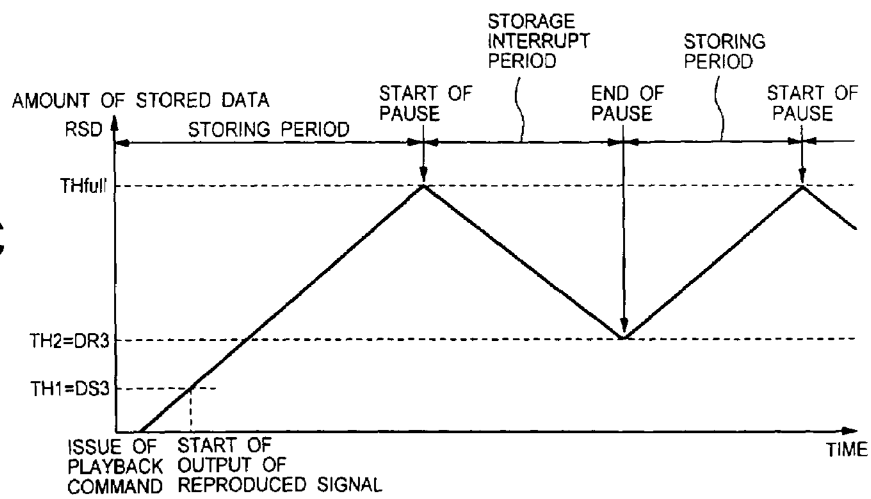

FIG. 3A through FIG. 3C show variations in the amount of stored data RSD during playback of the MD 1 in the MD player described above. FIG. 3A shows the case where the compressed audio signal of the music piece to be played back is recorded by the ATRAC method, FIG. 3B shows the case where the compressed audio signal of the music piece to be played back is recorded by the ATRAC3 method with the double compression, and FIG. 3C shows the case where the compressed audio signal of the music piece to be played back is recorded by the ATRAC3 method with the quadruple compression.

As shown in FIG. 3A through FIG. 3C, when a playback command is produced at the control portion 17, data of the music piece to be played back is read from the MD 1, and the data which has been read is stored in the memory 11. After the playback command is issued, the amount of stored data RSD in the memory 11 gradually increases. When the amount of stored data RSD in the memory 11 reaches the storage data amount TH1 for the start of outputting a reproduced signal, the compressed audio signal is read from the memory 11 in step S8 and is sent through the audio compression decoder 13 or 14 and the D/A converter 15 so that an analog reproduced audio signal is output. The storage data amount TH1 is set to one of DS1 through DS3 of which amounts are related as DS1>DS2>DS3. In the case the compressed audio signal of the music piece to be played back is recorded by the ATRAC method, the amount of data RSD that is stored in the memory 11 reaches the amount DS1, the largest among DS1 through DS3, as shown in FIG. 3A. In the case where the compressed audio signal of the music piece to be played back is recorded by the ATRAC3 method with the double compression, the amount of stored data RSD in the memory 11 reaches the amount DS2 which is the intermediate level among DS1 through DS3 as shown in FIG. 3B. In the case where the compressed audio signal of the music piece to be played back is recorded by the ATRAC3 method with the quadruple compression, the amount of stored data RSD in the memory 11 reaches the amount DS3, the lowest level among DS1 through DS3, as shown in FIG. 3C. Thus, the analog reproduced audio signal is early output in the order of information recorded by the ATRAC3 method with the quadruple compression, information recorded by the ATRAC3 method with the double compression and information recorded by the ATRAC method.

After that, when the amount of stored data RSD in the memory 11 has increased further to reach the full storage data amount THfull, the writing into the memory 11 is stopped and the reading from the MD 1 becomes in a pause state. Accordingly, the amount of stored data RSD gradually decreases after reaching the full storage data amount THfull.

When the amount of stored data RSD in the memory 11 has decreased to the storage data amount TH2 for the resumption of storage, the pause state is canceled to resume reading of the data of music piece to be played back from the MD 1, and the data that has been read is stored in the memory 11. The storage data amount TH2 for the resumption of storage is set to one of DR1 through DR3 of which amounts are related as DR1>DR2>DR3. In the case where the compressed audio signal of the music piece to be played back is recorded by the ATRAC method, the amount of stored data RSD in the memory 11 reaches the amount DR1, the largest among DR1 through DR3, as shown in FIG. 3A. In the case where the compressed audio signal of the music piece to be played back is recorded by the ATRAC3 method with the double compression, the amount of stored data RSD in the memory 11 reaches the amount DR2, the intermediate level among DR1 through DR3, as shown in FIG. 3B. In the case where the compressed audio signal of the music piece to be played back is recorded by the ATRAC3 method with the quadruple compression, the amount of stored data RSD in the memory 11 reaches the amount DR3, the lowest level among DR1 through DR3, as shown in FIG. 3C. Thus, the operation to store the read data in the memory 11 is early restarted in the order of the information recorded by the ATRAC method, the information recorded by the ATRAC3 method with the double compression, and the information recorded by the ATRAC3 method with the quadruple compression. In other words, an interrupt period of storing data in the memory 11 is the longest with the information recorded by the ATRAC3 method with the quadruple compression, followed by the information recorded by the ATRAC3 method with the double compression, then the information recorded by the ATRAC method.

During the subsequent playback of the MD 1, the storage of data to the memory 11 and the interruption of the storage are repeated as described above.

Since the reading operation by the pickup 3 can be put in a longer pause in the case of recorded information that has been compressed by a higher compression rate, as described above, energy consumption can be reduced. The pickup 3 can also be used in reading the information recorded on other part of the MD 1 during the pause of the reading operation of the pickup 3, namely during the pause of storing data in the memory 11.

The embodiment described above is an example of using the MD as a recording medium, although the present invention is not limited to the above constitution and can be applied to any reproducing apparatus that plays back a recording medium having compressed information recorded thereon.

In the embodiment described above, compressed information of all music pieces is recorded by the same compression method on an MD. However, the present invention can also be applied to the case where the compressed information of all music pieces is recorded on the MD not by the same compression method but using a plurality of compression methods. For example, in the case where the first music piece is recorded by the ATRAC method, the second music piece is recorded by the ATRAC3 method with the quadruple compression and the third music piece is recorded by the ATRAC method, the storage data amounts TH1 and TH2 are set as TH1=DS1 and TH2=DR1 for the first piece, TH1=DS3 and TH2=DR3 for the second piece and TH1=DS1 and TH2=DR1 for the third piece. While TH1 and TH2 are determined in accordance with the compression method for each music piece with the setting, TH1 and TH2 may also be determined in accordance with the compression method employed for the preceding and subsequent pieces. That is, when the duration of the second piece is shorter than the first and third pieces in the example described above, setting of TH1=DS1 and TH2=DR1 may be employed not only for the first and third pieces but also for the second piece.

The information reproducing apparatus of the present invention is, as described above, capable of starting the output of reproduced information quickly after starting the playback of a recording medium without impairing the vibration resistance.

What is claimed is:

1. An information reproducing apparatus for expanding compressed information recorded on a recording medium by one of a plurality of different compression methods, and outputs reproduced information based on the expanded information, said apparatus comprising:

a reading device for reading compressed information recorded on said recording medium;

a memory controller for writing the compressed information read by said reading device into a memory, reading the compressed information written in said memory in the order of writing;

a decoding device for demodulating the information read by said memory controller; and a judging device for determining which of the plurality of compression methods is used as a compression method of the compressed information read by said reading device, wherein said memory controller starts to read the compressed information from said memory when an amount of the compressed information written into said memory reaches a first storage information amount corresponding to a compression method determined by the judging device.

2. An information reproducing apparatus according to claim 1, wherein the higher a compression rate of the compression method determined by the judging device is, the smaller the first storage information amount becomes.

3. An information reproducing apparatus according to claim 1, wherein the first storage information amount for each of the plurality of compression methods is set so that a time period reproduced by the first storage information amount is substantially the same for the information compressed by any of the plurality of compression methods.

4. An information reproducing apparatus according to claim 1, wherein said memory controller controls said reading device in a pause state of reading to stop writing the compressed information into said memory when an amount of the compressed information written into said memory reaches a full storage information amount of the memory, and controls said reading device in a reading state to restart to write the compressed information read by said reading device into said memory when an amount of the compressed information written into said memory decreases to a second storage information amount, which is larger than the first storage information amount, corresponding to a compression method determined by the judging device by reading the compressed information from said memory after reaching the full storage information amount.

5. An information reproducing apparatus according to claim 4, wherein the higher a compression rate of the compression method determined by the judging device is, the larger the second storage information amount becomes.

6. An information reproducing apparatus according to claim 1, wherein said decoding device demodulates the compressed information read by said memory controller by using a demodulation method corresponding to a compression method determined by the judging device.

* * * * *